United States Patent
Lux

[15] 3,671,729
[45] June 20, 1972

[54] OBSCURATION DELINEATION CIRCUITRY

[72] Inventor: Foss Britton Lux, Oak Park, Mich. 48237

[73] Assignee: The United States of America as represented by the Secretary of the Air Force

[22] Filed: March 10, 1971

[21] Appl. No.: 122,707

[52] U.S. Cl. .................................235/186, 35/10.2, 35/10.4, 235/189
[51] Int. Cl. .........................................G06g 7/22
[58] Field of Search ................235/186, 189; 35/10.2, 10.4, 35/12

[56] References Cited

UNITED STATES PATENTS

| | | | |
|---|---|---|---|
| 3,060,596 | 10/1962 | Tucker et al. | 35/10.2 |
| 3,439,105 | 4/1969 | Ebeling et al. | 35/10.2 |
| 3,517,122 | 6/1970 | Owen | 35/10.2 X |
| 3,539,696 | 11/1970 | Sweeney et al. | 35/10.2 |

*Primary Examiner*—Joseph F. Ruggiero
*Attorney*—Harry A. Herbert, Jr. and George Fine

[57] ABSTRACT

A device for providing an indication, on a radial plot, of all the terrain obscured from the view of an assumed observer who is located at some reference elevation above the origin of the plot. The output is obtained by means of an X-Y plotter or coordinatograph. The stylus of the coordinatograph traces a series of radial straight lines from the point corresponding to the observation point. The stylus is lowered to provide a visible record if the terrain is visible from the observation point, and is raised to record a gap if the terrain is obscured or not visible. The device functions by storing a quantity representative of the largest value of the look angle, as the terrain is scanned from the center outward, and treats all terrain with a look angle smaller than any previous look angle as obscured.

3 Claims, 5 Drawing Figures

INVENTOR.
FOSS BRITTON LUX
BY Harry A. Herbert Jr.
George Fine
ATTORNEY.

INVENTOR.
FOSS BRITTON LUX
BY Harry A. Herbert Jr
George Fine
ATTORNEY.

3,671,729

OBSCURATION DELINEATION CIRCUITRY

BACKGROUND OF THE INVENTION

The present invention relates broadly to an automated chart analysis apparatus and in particular to an obscuration delineation apparatus providing an indication of all the terrain which is obscured from view of some reference elevation on a radial plot.

In the prior art, it was possible to determine points in view from a given observation and along a particular line of sight by noting the intersected elevation interval lines. This process was generally conducted manually and was extremly slow and tedious. There was always the ever present danger of false information due to human error or mistake. As an alternative method of determining points along a given line of sight, it is also feasible to describe the various points involved by means of rectangular coordinates. However, it has been found that merely knowing the location of any given point in rectangular coordinates or the horizontal and vertical distance from the observation point, provides very little information as to whether that particular point is visible from the observation point. Various points may be visible whether they are above or below the observation point and various other points which also may be above or below the observation point may be obscured. Further, knowing the polar coordinates of a point on the line of sight profile will not provide any data to allow determination of whether the point is obscured or not, unless the coordinates of all points closer to the observation point are also known. The present invention will automatically provide an terrain profile plot along a given line and will provide an indication for all points which may be viewed from a given observation point and also for those points which are obscured from view.

SUMMARY

The present invention utilizes an AC resolver to continuously compare a vertical distance, $\Delta E$, to a horizontal distance, $Y\gamma$, to provide an angle whose tangent is equal to the ratio $\Delta E/Y\gamma$. This obscuration data provides an indication on a radial plot of all the terrain which is obscured from the view of an observer who is located at reference elevation above the origin of the radial plot. The stylus of a coordinatograph traces a series of radial straight lines from the point which corresponds to the observation point. The stylus is lowered to provide a visible record if the terrain is visible from the observation point and is raised to record a gap if the terrain is obscured or not visible.

It is one object of the invention, therefore, to provide an obscuration delineation circuit having a visual indication on a radial plot of all terrain which is obscured from view.

It is another object of the invention to provide an obscuration delineation circuit having the capability of determining whether points which are above or below the observation point are obscured from view.

It is yet another object of the invention to provide an obscuration delineation circuit having the capability of detecting whether an object having a given height above the ground is obscured.

DESCRIPTION OF PREFERRED EMBODIMENT

Figure 1:
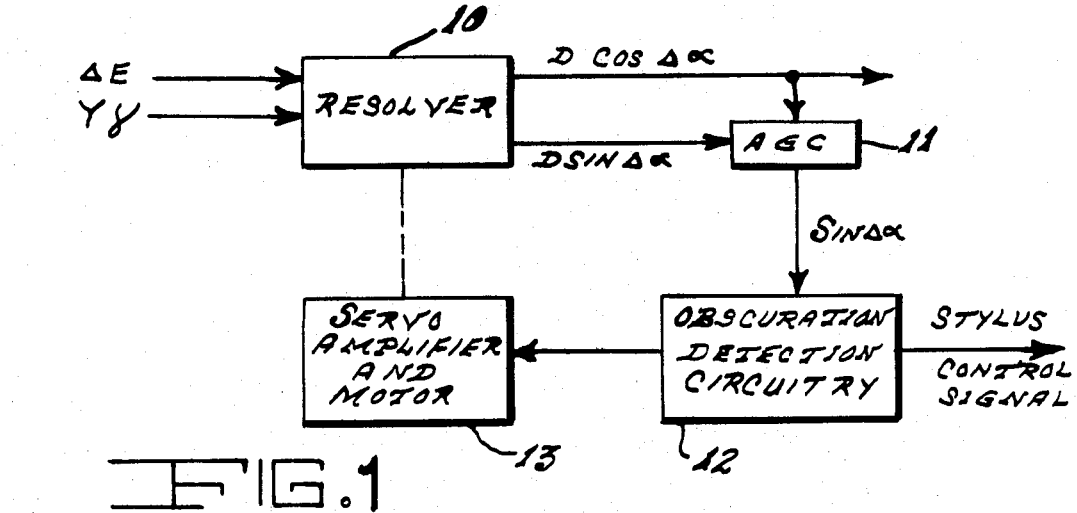
FIG. 1 is a block diagram of the obscuration delineation circuit in accordance with this invention.

Referring now to FIG. 1, there is shown a block diagram of the obscuration delineation circuit utilizing a resolver 10 to receive input signals, $\Delta E$, $Y\gamma$, where $\Delta E$ is the vertical distance and $Y\gamma$ is the horizontal distance. The output signals from resolver 10 are connected to AGC unit 11. The obscuration detection circuit 12 receives an output signal, $\sin \Delta\alpha$, from the AGC unit 11 and provides a control signal to the servo amplifier and motor 13 and a stylus control signal. The servo amplifier and motor unit 13 is mechanical linked to resolver 10. The obscuration delineation circuit provides a visual indication, on a radial plot, of all the terrain obscured from the view of an assumed observer who is located at some reference elevation above the origin of the radial plot. The output is obtained by means of an XY plotter, or coordinatograph (neither apparatus shown). The stylus (not shown) of the coordinatograph traces a series of radial straight lines from the point corresponding to the observation point. The stylus is lowered to provide a visible record if the terrain is visible from the observation point, and is raised to record a gap if the terrain is obscured or not visible. An AC resolver 10 is used to continuously compare a vertical distance, $\Delta E$, to a horizontal distance, $Y\gamma$, and produce an angle whose tangent is equal to the ratio $\Delta E/Y\gamma$. An AC resolver is used because the input signals were AC and the resolver performs the required trigonometric and summing operations quite simply. However if the signals were in the form of DC signals, other forms of resolvers, such as a potentiometer or an electronic function generator, would have served as well. Furthermore if the input signals were digital in nature, digital hardware could be used to perform the same basic operations. It is not necessary to form the arctangent (angle whose tangent is the ratio) $\Delta E/Y\gamma$, as the ratio could be used directly to determine whether the terrain is obscured. However, the arctangent method allows either of the inputs to go through zero without causing the difficulties usually associated with division by terms at or near zero.

Each point on the profile can be located within the plane by specifying its horizontal distance from the point of observation, O, and its vertical distance from the point O. This corresponds to using a rectangular coordinate system. Each point can also be located by specifying its distance, D, from O and the angle of elevation, $\alpha$. The angle of elevation as herein used is the angle between a vertical line, through the observation point, and a straight line passing through the observation point and the point whose location is being specified. This corresponds to using a polar coordinate system.

A point will be obscured only if its angle of elevation is smaller than the angle of some other point whose distance from the observation point is less than that of the present point. It may be seen that elevation angle of each succeeding point from the observation reference point must be equal to or larger than the previously determined angles in order to be visible. As the points on a profile or contour map are examined from the observation point, O, outward, the present point under consideration will have a larger distance, D, than all other previous points (i.e., these previous points are closer to the observation point, O). As the points on a profile or contour map are examined from the observation point O outward so that at any point, all previous points have a smaller D (are closer to O) than the present point. Therefore, to be obscured it is sufficient that some previous point have had an elevation angle larger than the present point. Thus, it is only necessary to store the largest value of $\alpha$ for all past points and to treat as obscured all new points which have a smaller elevation angle than the stored value. The value of $\alpha$ is obtained by means of an arctangent servo.

Figure 3:
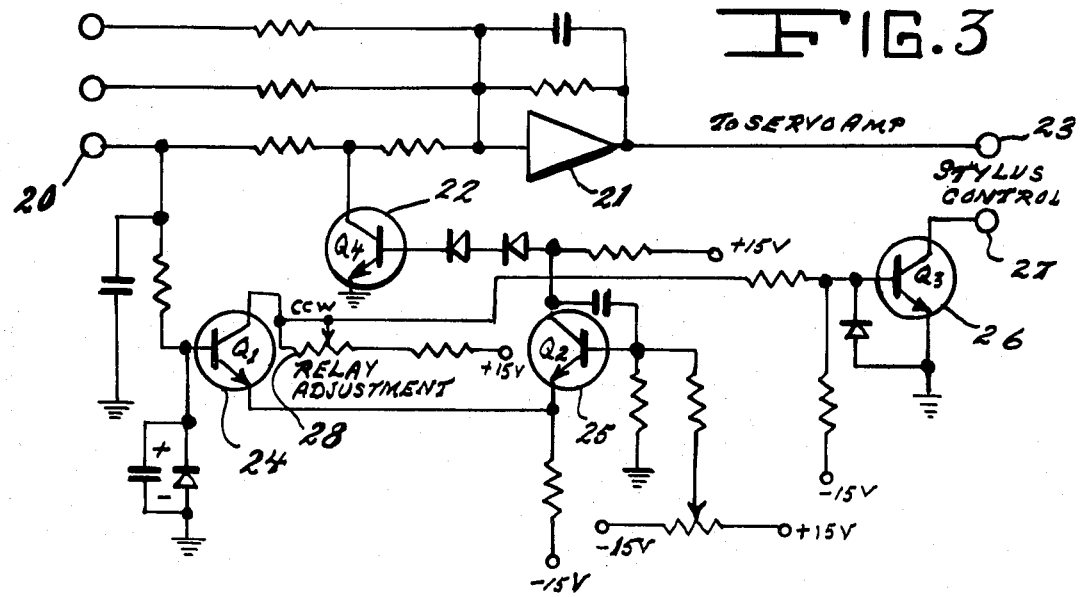
FIG. 3 is a schematic diagram of the obscuration detection circuit.

The storing of the maximum angle is accomplished by the obscuration delineation circuit by inhibiting the arctangent servo, which is used to compute elevation angle, whenever the error signal has a polarity such that the output angle would normally become smaller. FIG. 3 is a schematic diagram of the obscuration detection circuit which provides control signals to the servo amplifier and motor, 13 in FIG. 1 and the stylus control signal. A first circuit having an input terminal 20, an operational amplifier 21, an N-P-N transistor 22, and an output terminal 23, is used to detect where the error signal is of this polarity, which is defined as a negative signal and to provide a control signal to the servo amplifier and motor unit 13. The level at which the inhibiting action takes place is adjusted to be a more positive (less negative) level than that required to move the servo in a negative direction. A second circuit utilizing transistors 24, 25, 26 input terminal 20, and output terminal 27 provide a stylus control signal. The second circuit is adjusted by means of relay control 28 so that it detects a slightly more negative error signal than that required for the inhibiting action, and produces a signal which causes the terrain to be plotted as obscured. A relay contact (not shown), which is activated by the same circuits that cause the plotter to start over at the origin, is used to bypass the inhibit circuit and allow the arctangent servo to reset to a zero angle.

In chart analysis devices which may be utilized to provide the input signals to the present invention, the profile information is generally available in rectangular coordinate form. The elevation measurement from the plotter is subtracted from the reference elevation to produce the vertical coordinate $\Delta E$. The horizontal distance from the origin, $Y\gamma$, is available from the plotting motion controller. The relationship between the rectangular coordinates $\Delta E$, $Y\gamma$ and the polar coordinates $D$, $\alpha$ can be expressed as $$Y\gamma = D \sin \alpha \qquad (1)$$

and $$\Delta E = D \cos \alpha \qquad (2)$$

or $$D = (Y\gamma^2 + \Delta E^2)^{1/2} \qquad (3)$$

and $$\alpha = \arctan Y\gamma/\Delta E \qquad (4)$$

Figure 2:
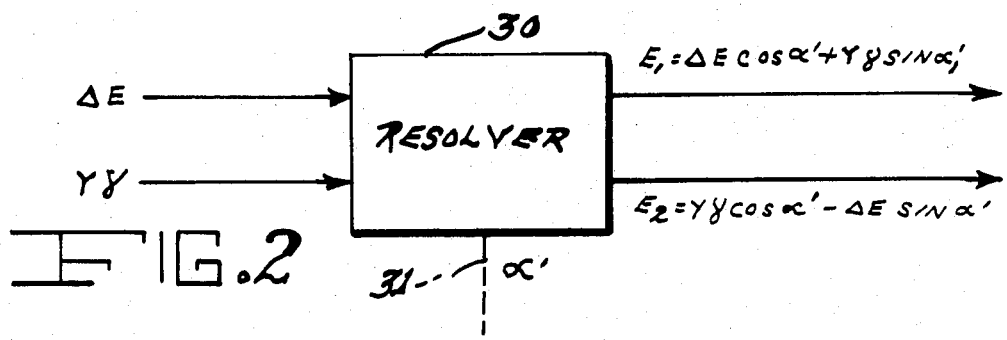
FIG. 2 is a block diagram of the resolver showing its input and output signals.

An AC resolver 30 is utilized as part of an arctangent servo to convert the profile information into its polar form. FIG. 2 is a block diagram of a resolver. The AC resolver 30 is particularly convenient to use because the available inputs are in the form of AC voltages. The AC resolver 30 is a device that has two orthogonal input windings and two orthogonal output windings arranged so that the amount of coupling between the input windings and the output windings can be controlled by a mechanical shaft input 31. The construction is such that if $\Delta E$ and $Y\gamma$ are assumed to be the two inputs, the two outputs will be $$E_1 = \Delta E \cos \alpha' + Y\gamma \sin \alpha' \qquad (5)$$

and $$E_2 = Y\gamma \cos \alpha' - \Delta E \sin \alpha' \qquad (6)$$

where $\alpha'$ is the input shaft angle, which is not necessarily equal to the angle $\alpha$ defined earlier in equation (4). These signals $E_1$ and $E_2$ are the coordinates of the point in a new rectilinear coordinate system rotated from the first by the angle $\alpha'$. Using the relationships defined in equations (1) and (2) we can rewrite (5) and (6) as $$E_1 = D \cos \alpha \cos \alpha' + D \sin \alpha \sin \alpha' \qquad (7)$$

and $$E_2 = D \sin \alpha \cos \alpha' - D \cos \alpha \sin \alpha' \qquad (8)$$

or $$E_1 = D \cos \Delta\alpha \qquad (9)$$

and $$E_2 = D \sin \Delta\alpha \qquad (10)$$

where $\Delta\alpha = \alpha - \alpha'$

If $\alpha'$ is made equal to $\alpha$, the quantity $E_2$ becomes zero, and for small differences between $\alpha$ and $\alpha'$, the quantity $E_2$ may be used to indicate the magnitude of the difference, or error. When the resolver is used as part of an arctangent servo, $E_2$ is used as the activating signal to drive the servo to null. Normally the servo will continue to run until $E_2$ is essentially zero and the resolver shaft angle $\alpha'$ is equal to $\alpha$, as defined in equation (4). As discussed previously, the arctangent servo is allowed to operate normally as long as the angle $\alpha'$ is increasing or remaining constant. However, the obscuration detection circuit prevents a negative error from causing the angle $\alpha'$ to become smaller. The negative error is detected and used to inhibit the servo and to indicate an obscured area. The inhibit portion of the circuit may be bypassed whenever the plotter is reset.

Figure 4:
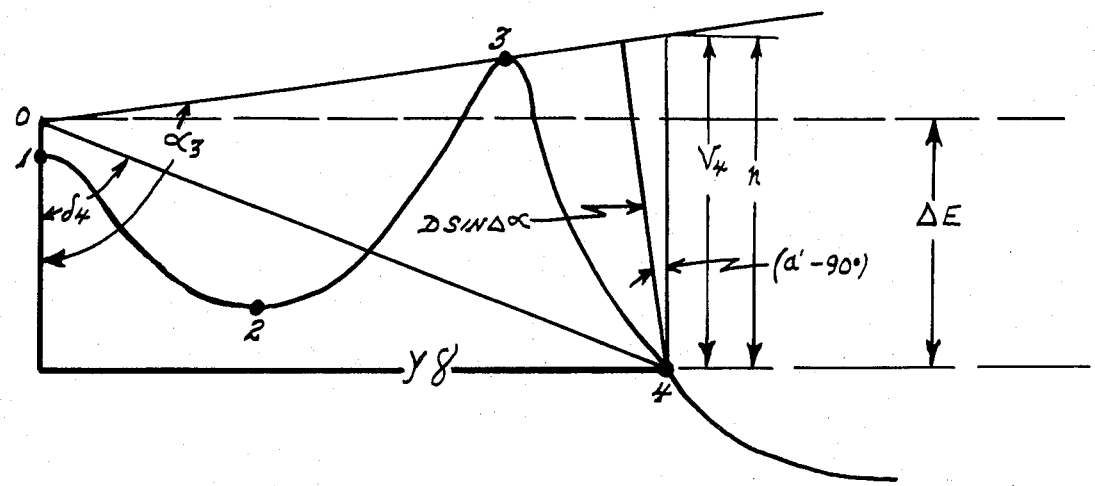
FIG. 4 is a typical terrain profile utilized in conjunction with the present invention.

The obscuration circuit determines what terrain is obscured from view from a central point but does not indicate to what extent the terrain is obscured. For instance, it does not provide any data or information that an object at a given height, $h$, above the terrain would be obscured from the observation point. The ability to detect whether an object at height $h$ above the ground is obscured, is a desirable feature. In order to determine this, it is necessary to develop a signal, $V$, proportional to the vertical distance from each point on the terrain profile, to the line of sight, and compare this signal with a second signal representing the quantity, $h$. If $V$ is found to be greater than $h$ then the point is considered to be obscured and the stylus would be lifted. FIG. 4 shows a section of a terrain profile having points 1-4 at different distances and elevations with respect to the observation point, O. In the present obscuration circuit, the obscured terrain would be indicated for the terrain between points 3 and 4. However, the terrain does not drop below the line of sight by a distance equal to $h$ until point 4 is reached. Therefore, an object having a distance $h$ above the terrain point being plotted, would not become obscured from the observation point until the plot passes through point 4 and the stylus should be lifted at point 4. However, the arctangent servo is required to continuously store the largest elevation angle encountered along the profile. Therefore it would have been inhibited at point 3. As shown by equation (10) the $E_2$ output of the resolver at point 4 will be $E_2 = D \sin \Delta\alpha$. This is a signal which represents the shortest distance from the line of sight to the terrain point 4 or the distance from the line of sight down to the point on the terrain profile measured at right angles to the line of sight. This distance would be shorter than the vertical distance by the factor sin $\alpha'$ as shown in FIG. 2. Thus, for a line of sight within $\pm$ 11° of horizontal ($\alpha' = 90°$) the error would be less than 2 percent. The error would reach 5 percent at angles greater than $\pm$ 18°, and 10 percent at angles greater than $\pm$ 25°. When compared to the possible error in measuring the actual elevation, this may be permissable.

Figure 5:
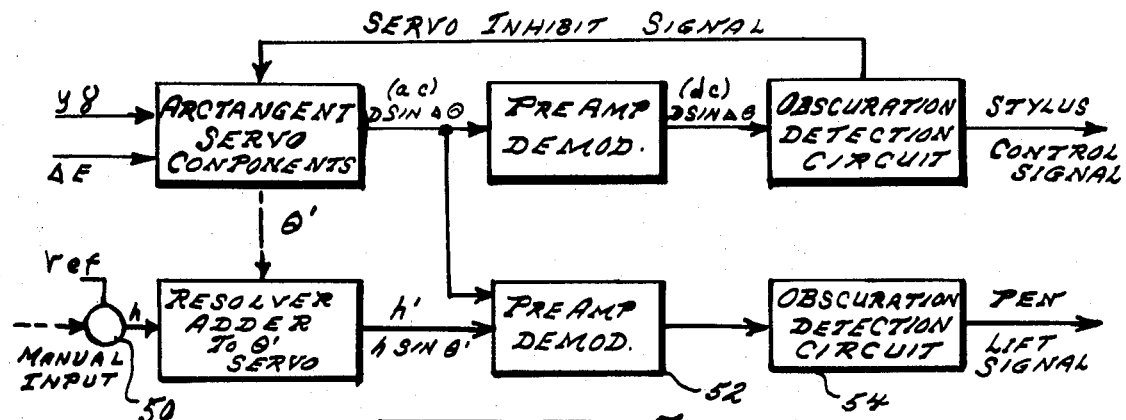
FIG. 5 is a block diagram of the obscuration delineation circuit with the obscured terrain modification included.

Referring now to FIG. 5, the modification of the circuit shown in FIG. 1 would be as follows: a potentiometer 50 would be added which would be used to introduce the height, $h$, of an object above the ground. The quantity $h$ would be summed with the signal $D \sin \Delta\alpha$ in the preamp demodulator unit 52 to provide a signal which indicates an obscured area. An additional detector circuit 54 would be required because the present circuit is combined with the circuit which determines when the servo is to be inhibited and cannot be separated. Therefore, the existing pen lift circuit of the obscuration detection circuit is duplicated to provide the new pen lift signal. If the error which is introduced by the fact that $D \sin \Delta\alpha$ is not measured vertically is not acceptable, a correction factor can be introduced by adding an extra resolver to the arctangent servo. Then by dividing the quantity $D \sin \Delta\alpha$ by sin $\alpha'$ the true vertical measurement can be obtained. However, it is preferable to convert the height input by multiplying $h$ by sin $\alpha'$ to produce a scaled $h'$ to match $D \sin \Delta\alpha$ as shown in FIG. 5.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. An obscuration delineation circuit providing control signals to an automated chart analysis apparatus comprising in combination:

an AC resolver having a first and second input winding, a first and second output winding and a mechanical input shaft, said first and second input winding being coupled to said first and second output winding, said mechanical input shaft controlling the amount of coupling between said first and second input winding and said first and second output winding, said first and second input winding receiving an input signal from said chart analysis apparatus, said first and second output winding providing output signals, an AGC unit connected to said first and second output winding to receive said output signals, said AGC unit providing an output signal, an obscuration detection circuit to detect the polarity of said output signal from said AGC unit, said obscuration detection circuit providing an inhibit signal when said output signal from said AGC unit is negative, said inhibit signal being utilized by said chart analysis apparatus to indicate as obscure, the terrain being plotted, said inhibit signal being the stylus control signal to said chart analysis apparatus, said obscuration detection circuit providing a servo control signal, and, a servo amplifier and motor unit receiving said servo control signal, said servo unit being connected to said mechanical input shaft of said resolver, said servo unit controlling the amount of coupling between said resolver input and output windings.

2. An obscuration delineation circuit as described in claim 1 wherein said obscuration detection circuit comprises:
   a first circuit to detect the polarity of said signal from said AGC unit, said first circuit providing a control signal to inhibit motion of said servo unit in a negative direction when said AGC signal is negative, and,
   a second circuit to detect an error signal from said AGC unit more negative than required for said inhibiting signal, said second circuit providing said terrain obscuration signal.

3. An obscuration delineation circuit as described in claim 1 further including
   a potentiometer having a reference voltage applied, said potentiometer being adjusted to provide an output voltage which represents the height of an object,
   an amplifier demodulator unit to sum said output voltage with said output signal from said resolver, said summed signal being the output of said amplifier demodulator, and
   an obscuration detection circuit connected to said amplifier demodulator unit to receive said sum signal, said obscuration detection circuit providing an output pen lift signal,
   a resolver driven by said arctangent servo which provides corrections to the height comparison circuit when the look angle is not horizontal.

* * * * *